ROBERT SHEDENHELM, OF DES MOINES, IOWA.

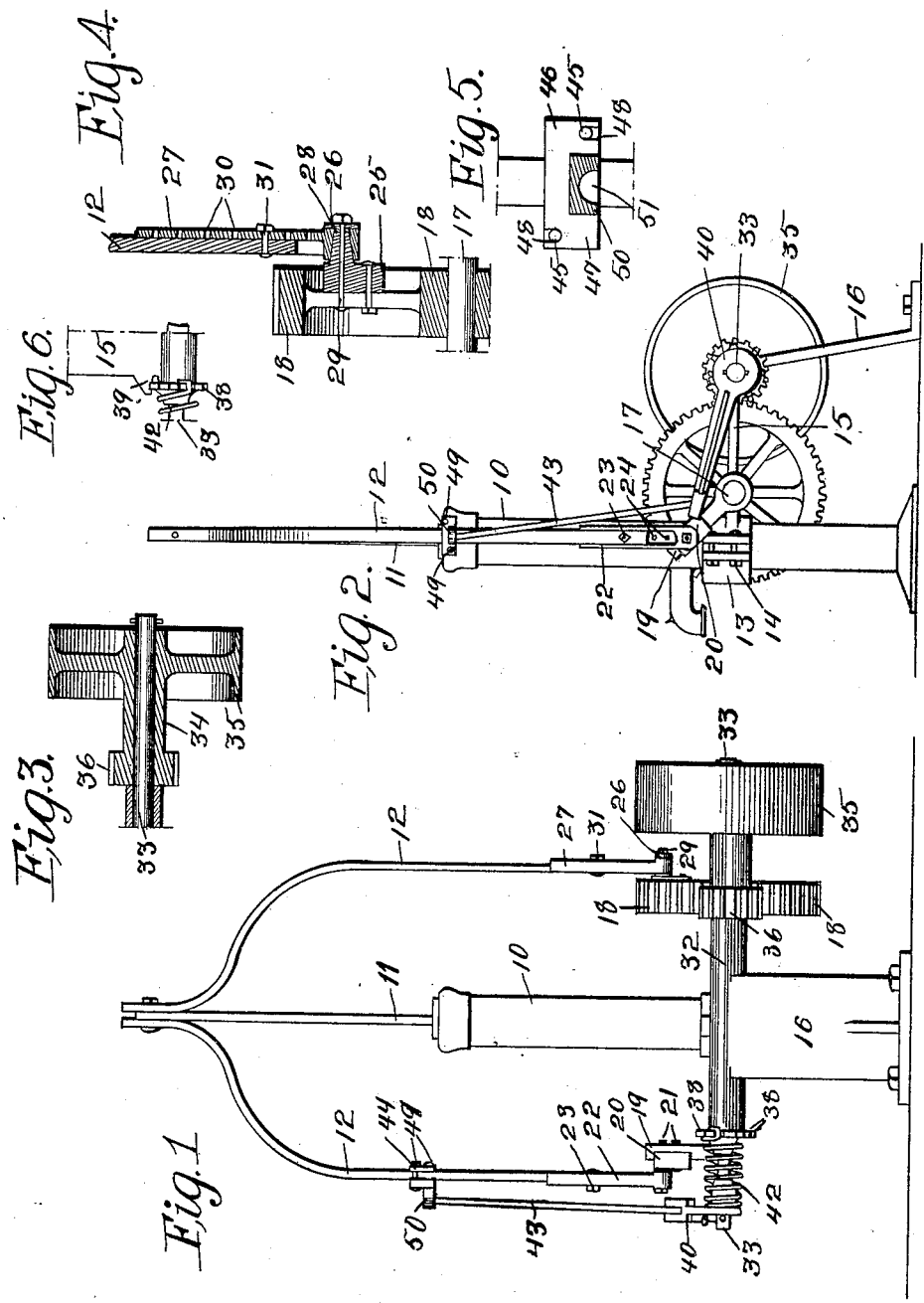

MECHANICAL MOVEMENT.

No. 925,138.　　　Specification of Letters Patent.　　　Patented June 15, 1909.

Application filed February 6, 1905. Serial No. 244,325.

*To all whom it may concern:*

Be it known that I, ROBERT SHEDENHELM, a citizen of the United States, residing at Des Moines, in the county of Polk and State of Iowa, have invented certain new and useful Improvements in Mechanical Movements, of which the following is a specification.

My invention relates to that class of devices in which a reciprocating pump piston is driven by a belt and my object is to provide simple, durable and inexpensive means whereby the pump piston rod may be reciprocated and the driving belt kept at substantially uniform tension at all times.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a front elevation of my invention applied to a pump. Fig. 2 shows a side elevation of same. Fig. 3 shows a detail sectional view of the belt pulley and connected parts. Fig. 4 shows a detail sectional view of a part of the gear wheel to illustrate the means for adjustably connecting the said gear with the pump piston rod. Fig. 5 shows a detail sectional view illustrating the means for adjustably and detachably connecting the rod of the spring actuated lever with the arm of the pump piston rod, and Fig. 6 shows a detail top view of the spring and the means for locking the notched disk that is engaged by one end of the spring.

Referring to the accompanying drawings, I have used the reference numeral 10 to indicate the pump stock and 11 the pump piston rod. Pivoted to the pump piston rod are the arms 12 by which motion is imparted to the piston rod.

The frame for supporting the operative parts of the device is designed to be attached to the pump stock and also to rest upon the floor and comprises a detachable collar 13 secured to the pump stock by the bolts 14 and a body portion 15 connected with the collar and projected horizontally outward from the pump stock and supported by a leg 16. Rotatably mounted in the body portion 15 adjacent to the pump stock is a shaft 17, on one end of which I have fixed the gear wheel 18 and on the other end I have fixed a crank arm 19. I have provided for connecting the crank arm 19 with the piston rod arm 12 as follows: Slidingly mounted upon the crank arm 19 is a sleeve 20 adjustably secured thereto by bolts 21. Pivoted to the sleeve 20 is a grooved bar 22 to receive the lower end of the piston rod arm 12. These parts are adjustably connected by the bolt 23 which may be passed through any one of a series of openings 24 in the arm 12. I have also provided for adjustably connecting the other arm 12 with the gear wheel 18 as follows: Secured to one of the spokes of the gear wheel 18 is a block 25 formed with a tapered journal 26. The numeral 27 indicates a bar formed with a tapered socket to receive the said journal and connected therewith by the washer 28 and bolt 29. By this arrangement of parts if the journal and socket should become worn an adjustment of the nut of the bolt 29 will operate to take up the wear and produces a tight fitting joint between the journal and socket. The said arm 27 is formed with a series of openings 30 designed to receive a bolt 31 which in turn is passed through the piston rod arm 12. In this way a rotary motion imparted to the shaft 17 will obviously reciprocate the piston rod 11 and both of the piston rod arms are adjustably connected at their lower ends.

I have provided for rotating the shaft 17 as follows: The numeral 32 indicates a sleeve formed in the frame 15 and extended parallel with the shaft 17. Supported in this sleeve 32 is a stationary shaft 33 and rotatably mounted on the shaft 33 is the hub 34 having at one end a pulley 35 and at its other end a small pinion 36, the latter meshing with the gear wheel 18. The pulley 35 is designed to be driven by a belt in the ordinary manner. Supported on the other end of the shaft 33 is a notched disk 38 which disk is adjustably locked in position by having the lug 39 on the part 15 inserted in one of its notches as shown in Fig. 6. Pivoted to the outer end of the shaft 33 is the lever 40. Mounted upon the shaft 33 between the lever 40 and the notched disk 38 is a coil spring 42 having one end in engagement with the lever 40 and its other end in engagement with one of the notches in the disk 38. In order to place this spring 42 under tension so that it will tend to force the end of the lever 40 upwardly, I first place one end of the spring in engagement with one of the notches of the disk 38, and then place its other end in engagement with lever 40 and finally turn lever 40 to position. In this way the tension of the spring may be easily and quickly adjusted and the longitudinal, expansive force of the spring will hold the notched disk 38 firmly in engagement with the lug 39.

Pivotally connected with the end of the lever 40 is a rod 43. I have provided for pivotally and adjustably connecting this rod 43 with the piston rod arm as follows: The numeral 44 indicates a plate having openings 45 in its corners placed against the inner face of the arm 12. The numeral 47 indicates a mating plate placed against the outer face of the arm 12 and formed with notches 48 in its opposite corners. Bolts 49 are passed through these notches and openings and serve to clamp said plates together with the arm 12 between them, thus providing for adjustably connecting the plates to the arm 12 and also providing for quickly detaching the outer plate by slightly turning it relative to the arm 12 so that the bolts 45 will pass out of the slots 48. Formed on the outer face of the plate 47 is an extension 50 formed with a socket 51 to receive the upper end of the rod 43. Assuming that the parts are assembled and adjusted as illustrated in the drawings and assuming that a belt is applied to the pulley 35 for rotating it, motion would be transmitted from the pulley to the small pinion and from thence to the gear wheel and this would rotate the shaft 17 and impart a reciprocating motion to the piston rod 11. In this connection it is to be understood that the pump piston rod moves downwardly readily on account of its own weight, but is moved upwardly only upon the application of considerable power because during its upward stroke it raises the water. When the piston moves downwardly, the arm 43 is forced downwardly against the pressure of the spring 42 and hence when the piston moves upwardly, the power stored in the spring upon the downward stroke of the piston will aid in raising the piston and it is possible by an accurate adjustment of the tension of the spring 42 to cause the downward movement of the piston rod to require exactly the same amount of applied power as the upward movement and hence the amount of applied power required to rotate the pulley 35 is continuous and uniform.

Having thus described my invention, what I claim and desire to secure by Letters Patten of the United States, therefor is—

1. In a pump driving mechanism, the combination of a reciprocating rod, a supporting frame, a shaft mounted in the frame, means for imparting a rotary motion to the shaft, means for connecting the shaft with the said rod to impart a reciprocating motion to it when the shaft is rotated, an arm pivoted to said frame and extended laterally, a rod connected to the said rod and to the said arm and extended vertically, and a spring for normally exerting an upward pressure on said arm.

2. In a pump driving mechanism, the combination of a reciprocating pump rod, a frame, a pulley having an extended hub and a pinion integral with said hub, a shaft rotatably mounted in the frame, a gear wheel fixed thereto and in mesh with the pinion, an arm on said shaft, means for connecting the pump rod with said arm, and with the gear wheel, a second arm, and a spring connected with said arm designed to move it to its limit in one direction, and to have power stored in it, when the rod and arm are moved by the rotary shaft in the other direction.

3. In a pump driving mechanism, the combination of a pump rod, a frame, a shaft mounted in the frame, a gear wheel and an arm fixed thereto on opposite sides of the pump rod, means for connecting the pump rod with said gear wheel, an arm to reciprocate the pump rod when the shaft is rotated, a hub having a pulley and a small pinion thereon, the latter being in mesh with the gear wheel, a rotatable shaft mounted in the frame, an arm fixed to the shaft and connected with the pump rod, and a spring mounted on said shaft, and designed to exert a continuous upward pressure upon the pump rod during its entire stroke.

4. In a pump driving mechanism, the combination of a pump rod, a frame, a shaft mounted in the frame, a gear wheel, and an arm fixed thereto on opposite sides of the pump rod, means for connecting the pump rod with said gear, an arm to reciprocate the pump rod when the shaft is rotated, a pulley having an extended hub and a pinion thereon, the latter being in mesh with the gear wheel, a rotatable shaft mounted in the frame, a second shaft, an arm fixed to the shaft and connected with the pump rod, and a spring mounted on said shaft, and designed to exert a continuous upward pressure upon the pump rod during its entire stroke, and means for adjusting the tension of said spring.

5. The combination of a reciprocating pump rod, a frame, a hub rotatably supported on the frame, a pulley and a pinion formed integral with the said hub, a shaft rotatably mounted in the frame, a gear wheel fixed thereto and meshed with the aforesaid pinion, an arm on said shaft, two arms connected with the pump rod and adjustably connected with the said arm and gear wheel on the shaft, a shaft mounted in the frame, a notched disk rotatably mounted on the said shaft, said frame having a stationary lug to be engaged by the notched disk, a spring coiled upon the said shaft with one end adjustably connected with the notched disk, an arm fixed to the other end of the said shaft and having said spring connected therewith, a rod pivotally connected with said arm and adjustably connected with one of the pump rod arms.

Des Moines, Iowa, January 13, 1905.

ROBERT SHEDENHELM.

Witnesses:
J. RALPH ORWIG,
S. F. CHRISTY.